United States Patent [19]
Garmater

[11] Patent Number: 5,299,744
[45] Date of Patent: Apr. 5, 1994

[54] GRANULATING, SEPARATING AND CLASSIFYING RUBBER TIRE MATERIALS

[76] Inventor: Robert A. Garmater, P.O. Box 186, Harlan, Ind. 46743

[21] Appl. No.: 933,173

[22] Filed: Aug. 21, 1992

[51] Int. Cl.$^5$ .................. B07B 4/02; B02C 23/10
[52] U.S. Cl. ................... 241/19; 241/24; 241/79.001; 241/DIG. 31; 209/27
[58] Field of Search .......... 241/19, 24, 79.1, DIG. 31; 209/26, 27

[56] References Cited

U.S. PATENT DOCUMENTS

| | | | |
|---|---|---|---|
| 2,200,472 | 5/1940 | Erdmann | 209/27 |
| 2,462,645 | 2/1949 | Knowland | 241/DIG. 31 X |
| 3,004,721 | 10/1961 | Notzold | 241/19 X |
| 3,364,526 | 1/1968 | Varady et al. | 241/DIG. 31 X |
| 3,836,085 | 9/1974 | Brown | 241/79.1 X |
| 3,856,217 | 12/1974 | Brewer | 241/24 X |
| 4,113,186 | 9/1978 | Smith | 241/DIG. 31 X |
| 4,618,415 | 10/1986 | Vecchio et al. | 241/79.1 X |
| 4,726,530 | 2/1988 | Miller et al. | 241/24 |

*Primary Examiner*—Hien H. Phan
*Assistant Examiner*—Clark F. Dexter
*Attorney, Agent, or Firm*—Roger M. Rickert

[57] ABSTRACT

A rubber tire component reclamation technique which provides tire rubber fragments classified according to size. Preferred apparatus for rubber tire component reclamation includes a feed hopper for receiving pieces of discarded tires, a granulating chamber coupled to the feed hopper for cutting the received pieces into smaller fragments, and an exit chute providing an output from the granulating chamber through which tire fragments fall. An air flow is induced upwardly through the exit chute to urge the less dense components such as yarn and fabric upwardly against gravity and out of the upper portion of the chute. The air flow is of sufficient force to prevent commingling and compaction of the less dense components with the remaining components of the tire fragments. A magnetized drum is located near the lower end of the exit chute for segregating the ferromagnetic components of the tire fragments. A fragment classifier receives the fragments which are not trapped by the magnetic drum and segregates those received fragments into at least two, and preferably three, separate groups according to fragment size.

13 Claims, 3 Drawing Sheets

GRANULATING, SEPARATING AND CLASSIFYING RUBBER TIRE MATERIALS

SUMMARY OF THE INVENTION

The present invention relates generally to machines for and techniques of reclaiming material from discarded vehicle tires, e.g., recycling rubber vehicle tires and more particularly to a device for separating the lighter fabric or yarn on the one hand and the heavier steel or wire portions on the other hand from particles of rubber which may be either used for other purposes or recycled.

Discarded vehicle tires are unsightly, provide a suitable breading location for mosquitos, are difficult to bury in conventional landfill locations, present air pollution problems when burned and generally present a disposal problem. Such tires are currently discarded in large quantities representing a significant waste of resources. The inventor herein has found that such tires may be debeaded, ground into particles, and the rubber component extricated for use as a ground cover for playgrounds, jogging trails and the like since those particles are resilient, relatively clean, and do not absorb moisture. Such recycled rubber tire particles are currently sold by the inventor's company under the registered trademark Tire Turf.

Reclamation of the materials in such tires is made more difficult by the steel wire typically located in the bead portion of the inner periphery of the tire where the tire contacts the vehicle rim. This strong steel wire is detrimental to tire reclamation equipment which is designed to shred, grind up, or otherwise recycle the tire material.

Attempts to remove this bead portion of the tire and the steel wire contained therein have, until recently, not met with much success. U.S. Pat. No. 2,298,685 discloses a machine designed to remove the bead portion from scrap tires. This device attempts to remove only the steel wire while saving the surrounding tire material for subsequent reprocessing and has not met with commercial success. This patent refers to earlier attempts where the casing was severed and the bead portion including the wire was discarded, but does not disclose how such severing was accomplished. The patented device does not separate the beads from a tire, but rather slits the tire casing to allow removal of the steel wire strands from the bead while leaving the rubber and fabric material. In my U.S. Pat. No. 4,770,077 there is disclosed a device for removing the steel wire containing bead portion of such tires to facilitate subsequent processing of the remaining tire portion. That patented device severs the bead ring or inner section of the tire containing several strands of very hard wire and rubber reinforcing from the tire casing. A tire is placed over two powered spools and an idler spool and then stretched by moving one powered spool away from the other two spools. When the two powered spools revolve in unison, the tire is driven to rotate past cutting knives which engage the tire and sever the bead rings. Such debeaded tires or grossly cut up portions or parts thereof may form the input material for the present invention.

Attempts at an overall reclaiming process for tires are not new. For example, U.S. Pat. Nos. 4,342,647; and 4,813,614 employ very low temperature (well below freezing) processing techniques. U.S. Pat. No. 2,471,043, employs fans and screens to separate different rubber particle sizes. U.S. Pat. No. 2,786,686 teaches a grinding scheme utilizing static electricity to separate the rubber particles. In U.S. Pat. No. 8,923,256, a magnetic separation followed by a vibrating screen technique with an upward flow of air is employed Nesting conical surfaces and an upward flow of air to effect separation of particles (not necessarily rubber) has been attempted in the prior art as has feeding material from a hopper to a magnetic separator. Such vibrating screen techniques are generally unsatisfactory since wire and fabric have already commingled and the screen will plug with wire. In the present invention, this is avoided by removing the fabric early in the process and prior to a magnetic drum separator.

None of these prior art attempts have been entirely satisfactory. Invariably, they are either too complex and expensive to be practical or they either fail to completely effect separation of the fabric materials from the rubber leading to an inferior and unclean product, or to a material unsuited to recycling because of the presence of too much foreign matter in the product.

The prior art recognizes granulators or grinders which may receive rubber chips or complete tires and grind the input material into small chips of mean diameter ¼ to ½ inch. The prior art also recognizes magnetic drum devices for separating steel bead wire from the rubber chips. Finally, screw conveyor arrangements for classifying particle sizes are known. The present invention marries these techniques with a unique flow separation process to achieve economical and effective separation of clean classified rubber. In the present invention, immediately after such a granulator, an airflow generated by two blowers passes upwardly through a chute and lifts the yarn and fabric (e.g., non-steel tire cord material) before it gets commingled with the wire (steel tire cord material) to such an extent that it is impossible to subsequently separate. The positioning of baffles determines how effective this separation is. A second set of blowers cause an upward air flow through screens which pass the material according to particle size and keep the lighter particles (again, yarn and fabric) from passing through the screens.

Among the several objects of the present invention may be noted the provision of a rubber tire component separating device which effects separation before particles come to rest or otherwise impinge any solid object; the provision of a tire recycling technique which more completely separates the tire components than was heretofor possible; the provision of an improved technique for reclaiming the rubber from worn-out tires the provision of a more efficient and economical process for manufacturing Tire Turf; the provision of a rubber tire component separating device which effects separation before particles are completely commingled; the provision of a rubber tire component reclamation technique which provides essentially metal and fabric-free tire rubber particles classified according to size; and overall improvements in tire reclamation techniques. These as well as other objects and advantageous features of the present invention will be in part apparent and in part pointed out hereinafter.

In general, the separation of rubber from other components of discarded tires is accomplished by granulating tires to form tire fragments and then free fall separating the lighter-than-rubber components from the tire fragments as those fragments emanate from the granulating step and prior to the fragments having come into contact with any fixed surfaces. The heavier-than-rubber components (typically steel) are subsequently magnetically separated the from the fragments and the remaining tire rubber fragments are classified by size.

Also in general and in one form of the invention, apparatus for rubber tire component reclamation includes a feed hopper for receiving pieces of discarded tires and a granulating chamber coupled to the feed hopper for cutting the received pieces into smaller fragments. There is an exit chute through which those smaller tire fragments fall and an air flow is induced upwardly through the exit chute to urge the less dense components upwardly against gravity and out of the upper portion of the chute. The air flow is desirably of sufficient force to prevent commingling and compaction of the less dense components with the remaining components of the tire fragments

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
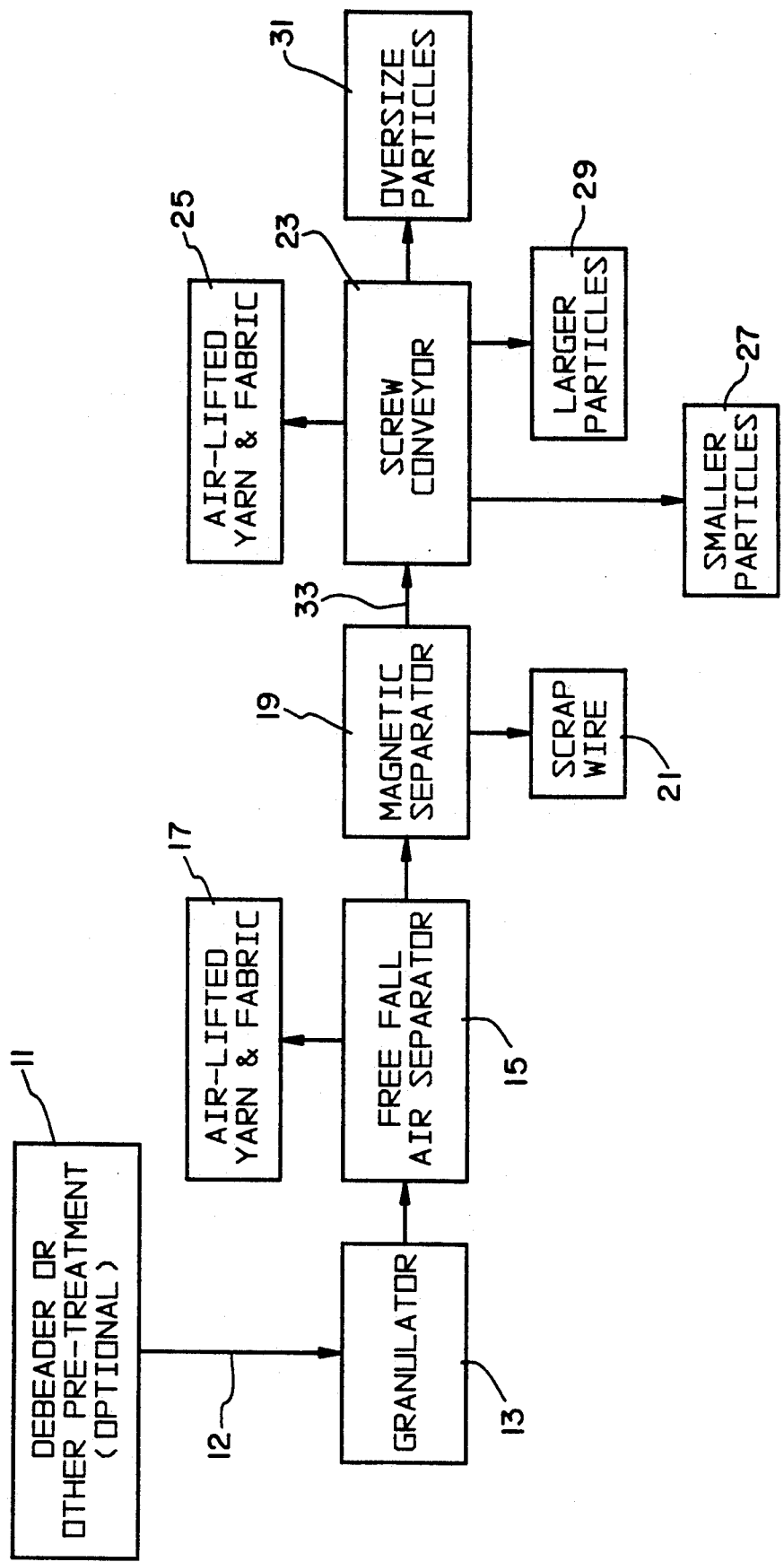
FIG. 1 is a schematic block diagram of the overall tire rubber reclamation technique according to the present invention.
Figure 2:
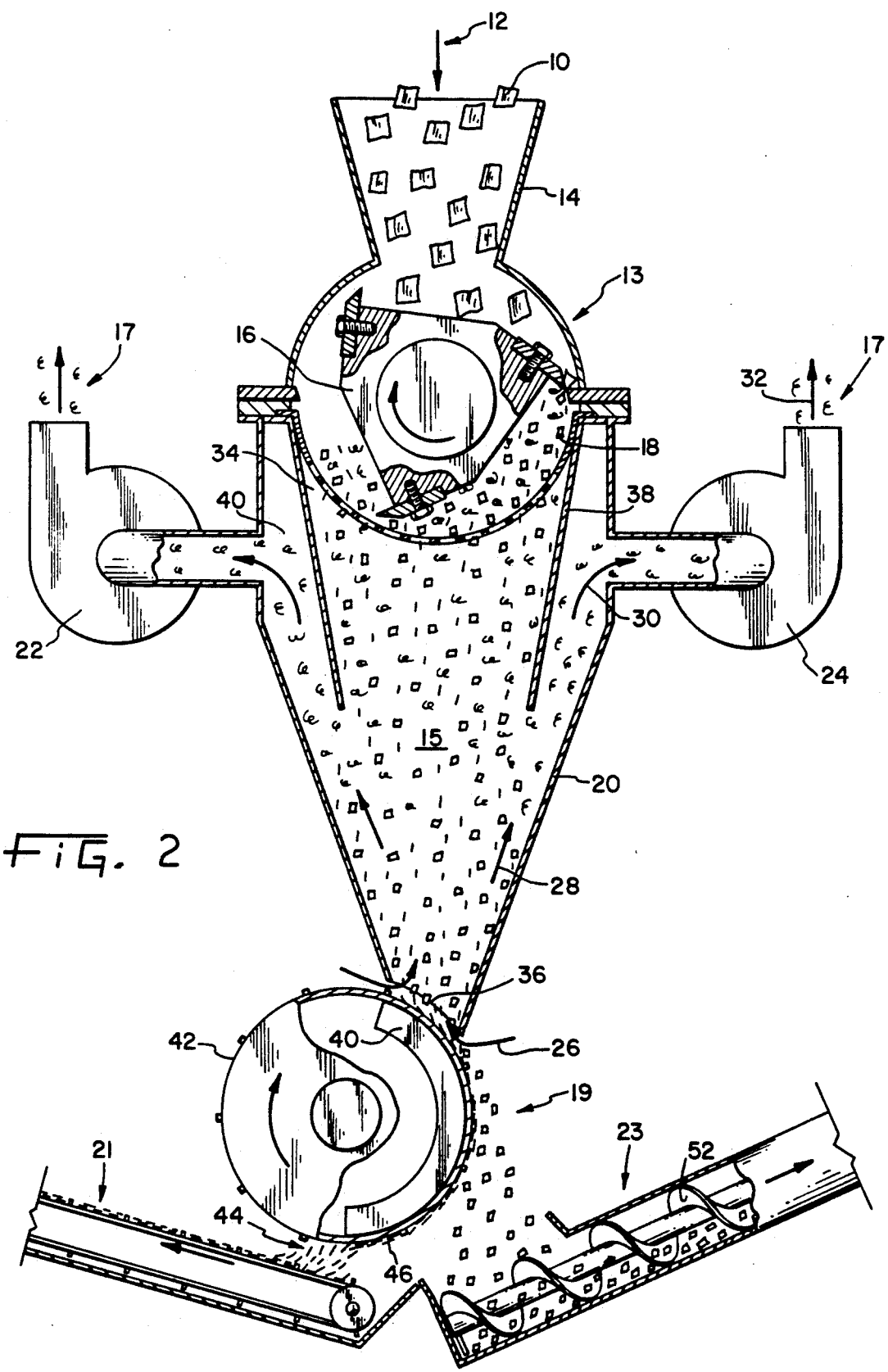
FIG. 2 is a cross-sectional view of apparatus suitable for the practice of the present invention.

Considering first FIGS. 1 and 2, the granulator or grinder 13 may receive anything from small rubber chips to complete discarded tires. Frequently, the steel wire bead of the tires will be removed at 11. The term "pieces" is used throughout to include the entire range of possible granulator inputs on line 12 from small rubber chips to complete tires. These "pieces" are reduced in size by the granulator 13 and the output will be termed "fragments." Typical fragments will have a mean diameter of on the order of one inch or less. A feed hopper 14 receives pieces such as 10 of discarded tires at the input of the granulator 13 as indicated by arrow 12. The granulator itself is in the form of a granulating chamber which is coupled to the feed hopper 14 and contains a rotating cutter wheel 16 for cutting the received pieces into smaller fragments such as 18.

An exit chute 20 provides an output from the granulating chamber 13 through which tire fragments fall. This chamber functions as a free fall air separator 15. A pair of blowers 22 and 24 induce an air flow upwardly through the exit chute to urge the less dense components upwardly against gravity and out of the upper portion of the chute as indicated by the arrows 26, 28, 30 and 32. This air flow is of sufficient force to prevent commingling and compaction of the less dense components with the remaining components of the tire fragments. The less dense components which are raised in the chute include the yarn or fabric components of the tires as well as some very fine rubber. The exit chute 20 comprises a tapered housing with a relatively wide mouth 34 at the upper end thereof for receiving tire fragments from the granulator 13 and a relatively small opening 36 at the bottom end thereof through which tire fragments may fall. There is a tapered baffle 38 within the housing which separates the mouth 34 from the upper portion 40 of the chute through which the less dense components exit. Thus, the airflow generated by the two blowers 22 and 24 is upwardly through the chute 20 and lifts the yarn and fabric (e.g., non-steel tire cord material) before it gets commingled with the wire (steel tire cord material) to such an extent that it is impossible to subsequently separate. The positioning of baffle 38 aids the effectiveness of this separation.

Located near the lower end of the exit chute and closely adjacent the opening 36 is the magnetic separator 19. This includes a magnetic drum arrangement for segregating the ferromagnetic components 21 of the tire fragments from the remaining rubber and other components indicated at 33. Typically these ferromagnetic components will be cut up pieces of the steel belt portion of the tire (as opposed to the steel bead which is may be removed at step 11). A magnet 40 is fixed within the rotatable cylindrical drum 42. This magnet 40 is located closely adjacent a segment only of the interior of the drum and causes the ferromagnetic components such as 46 of the tire fragments to adhere to the drum surface and be rotated thereby to a location indicated generally by 44 which is remote from the magnet so that the ferromagnetic components no longer adhere to the drum surface and may be easily removed and conveyed away.

Figure 3:
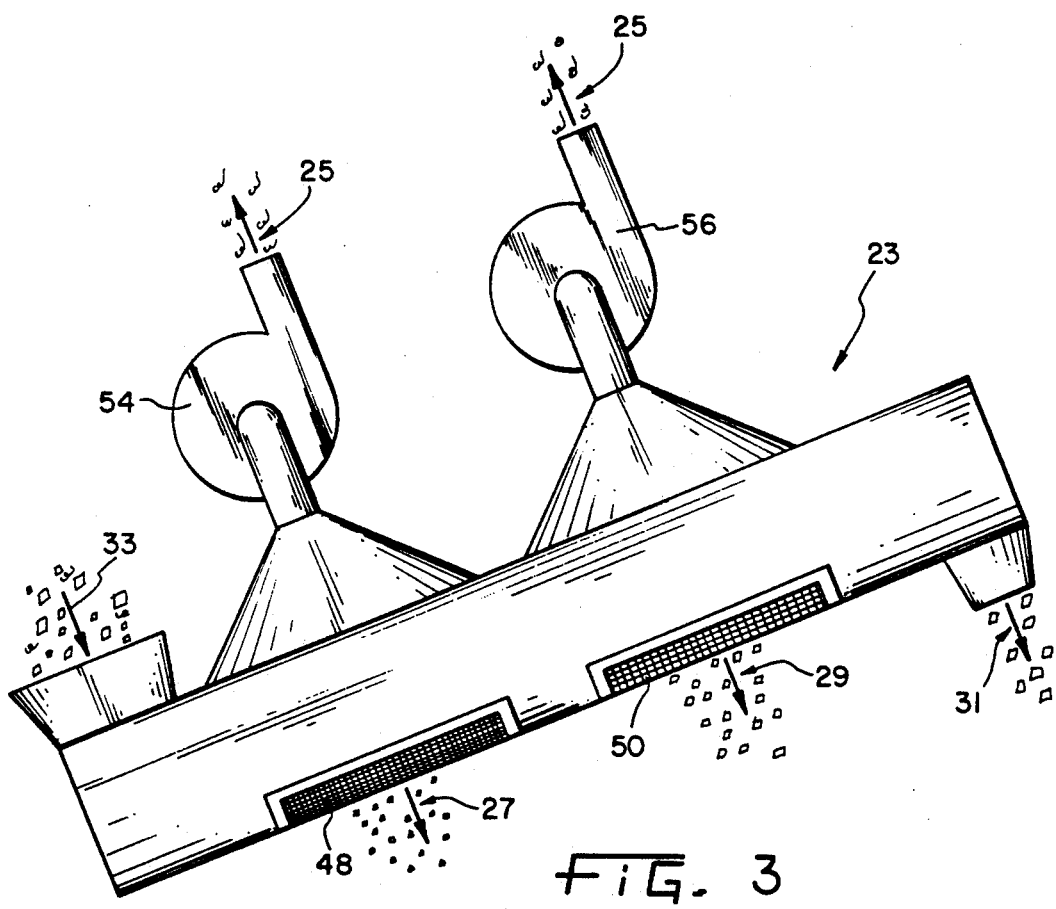
FIG. 3 is a cross-sectional view showing the screw conveyor and particle classifying apparatus portion of FIG. 2 in greater detail.

The screw conveyor 23 is shown in greater detail in FIG. 3. It functions as a three stage fragment classifier for segregating the fragments into three groups while removing additional less dense components 25 such as yarn or fabric and very small rubber particles. The classifier has a first sieve portions 48 and a second larger particle passing sieve portion 50. The inclined screw 52, which is typically of a circular helix shape, conveys fragments angularly upwardly past the first 48 and second 50 sieve portions. A first air flow stage including blower 54 is located near the first sieve portion 48 along the inclined screw 52 for segregating smaller rubber fragments by air flow upwardly to raise lighter fragments while allowing smaller more dense fragments to fall through the first sieve portion as shown by arrow 27. The larger more dense portions are conveyed past the first sieve portion and further upwardly along the inclined screw. There is a second air flow stage including blower 56 near the second sieve portion 50 along the inclined screw for segregating somewhat larger rubber fragments again by air flow upwardly to raise lighter fragments while allowing the somewhat larger more dense fragments to fall through the second sieve portion as indicated by arrow 29. Still larger more dense portions are conveyed past the second sieve portion 50 and further upwardly along the inclined screw to exit therefrom at 31 as the third group of tire rubber fragments classified according to size. In one preferred form, the first sieve portion 48 comprises an approximately 4-mesh screen and the second sieve portion comprises an about 2-mesh screen so that the smaller particles 27 have mean diameter of about ¼ inch or less while the larger particles 29 have mean diameter of between ¼ and ½ inch. The oversize particles 31, then, are of mean diameter over ½ inch. Thus, the blowers 54 and 56 cause an upward air flow through the screens 48 and 50 which screens pass the rubber material according to particle size while the upward airflow keeps the lighter particles (again, yarn and fabric) from passing through the screens.

The method of operation of the invention should now be clear. Whole tires, tires with the bead removed or smaller tire pieces are granulated to form tire fragments. The tire fragments are allowed to fall through a chute as they exit the granulating step and a free fall separation of the lighter-than-rubber components from the tire fragments is performed by providing an upward air flow through the chute. Preferably, this free fall separation occurs prior to the fragments coming into contact with any fixed surfaces. The heavier-than-rubber components are subsequently magnetically separated from the fragments by magnetically attaching ferromagnetic components of the tire fragments to a moving member and subsequently releasing those ferromagnetic components from the moving member at a location remote from the remaining tire fragments. The remaining tire fragments are classified by segregating them into three groups according to size.

From the foregoing, it is now apparent that a novel scheme for separating the components of used rubber tires has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. The method of separating rubber from other components of castaway tires comprising the steps of:
   debeading the tires to remove any steel tire bead;
   granulating the tires to form tire fragments including lighter-than-rubber components and ferromagnetic components;
   separating the lighter-than-rubber components from the tire fragments as those fragments emanate from the granulating step and prior to the tire fragments coming to rest on any fixed surfaces by causing the tire fragments to free fall downwardly after granulating and simultaneously providing an upwardly directed air flow into the falling tire fragments;
   subsequently separating the ferromagnetic components from the tire fragments; and
   classifying the remaining tire fragments by segregating them into at least three groups according to size.

2. The method of claim 1 wherein the tire fragments are caused to fall through a chute as they complete the granulating step and the step of separating is performed by directing the provided upwardly directed air flow through the chute.

3. The method of claim 1 wherein the step of subsequently separating is performed by magnetically attaching the ferromagnetic components of the tire fragments to a moving member and subsequently releasing those ferromagnetic components from the moving member at a location remote from the remaining tire fragments.

4. Apparatus for rubber tire component reclamation comprising:
   a feed hopper for receiving pieces of discarded tires;
   a granulating chamber coupled to the feed hopper for cutting the received pieces into smaller tire fragments;
   an exit chute, coupled to the granulating chamber for providing an output from the granulating chamber, through which the tire fragments fall, said exit chute having an outlet at an end remote from said granulating chamber;
   means for inducing an air flow upwardly from said outlet through the exit chute to urge less dense components of said tire fragments upwardly against gravity and out of the chute, the air flow being of sufficient force to prevent commingling and compaction of the less dense components with remaining components of the tire fragments; and
   a fragment classifier positioned near said exit chute for receiving and segregating remaining components of the tire fragments into three separate groups according to fragment size while removing additional less dense components, said fragment classifier comprising first and second sieve portions aligned along a length of the fragment classifier, an inclined screw extending along the length of the fragment classifier and extending past said first and second sieve portions for conveying fragments angularly upwardly past the first and second sieve portions respectively, a first air flow stage near the first sieve portion along the inclined screw for segregating smaller tire fragments by providing an air flow upwardly in a direction away from the first sieve portion to raise lighter fragments while allowing smaller more dense fragments to fall through the first sieve portion and larger more dense portions to be conveyed past the first sieve portion and further upwardly along the inclined screw, a second air flow stage near the second sieve portion along the inclined screw for segregating somewhat larger rubber fragments by providing an air flow upwardly in a direction away from the second sieve portion to raise lighter fragments while allowing some of the somewhat larger more dense fragments to fall through the second sieve portion and still larger more dense portions to be conveyed past the second sieve portion and further upwardly along the inclined screw to exit therefrom as the third group to thereby reclaim the rubber component of the tire fragments in the form of tire rubber fragments classified according to size.

5. The apparatus of claim 4 wherein the first sieve portion comprises an approximately 4-mesh screen and the second sieve portion comprises an about 2-mesh screen.

6. The apparatus of claim 4 further comprising means located near the outlet of the exit chute for segregating ferromagnetic components of the tire fragments.

7. The apparatus of claim 6 wherein the means for segregating the ferromagnetic components of the tire fragments comprises a rotatable cylindrical drum, a magnet fixedly located closely adjacent a portion of the interior of the drum for causing ferromagnetic components of the tire fragments to adhere to the drum surface and to be rotated thereby to a location remote from the magnet where said ferromagnetic components are easily removed and conveyed away.

8. The apparatus of claim 4 wherein the exit chute comprises a tapered housing having a relatively wide mouth at an upper end thereof for receiving tire fragments from the granulator and a relatively small opening at the outlet located at a bottom end thereof through which said remaining components of the first fragments fall.

9. The apparatus of claim 8 wherein the exit chute further includes a tapered baffle within the housing which separates said relative wide mouth from an upper exit portion of the chute through which the less dense components exit.

10. The apparatus of claim 9 further comprising means located near a lower end of the exit chute intermediate the outlet and the fragment classifier for segregating ferromagnetic components of the tire fragments, the means for segregating the ferromagnetic components of the tire fragments comprising a rotatable cylindrical drum, a magnet located closely adjacent a segment of the interior of the drum for causing ferromagnetic components of the tire fragments to adhere to the drum surface and be rotated thereby to a location remote from the magnet where said ferromagnetic components are easily removed and conveyed away.

11. Apparatus for rubber tire component reclamation comprising:
   a feed hopper for receiving pieces of discarded tires;
   a granulating chamber coupled to the feed hopper for cutting the received pieces into smaller tire fragments;
   an exit chute coupled to said granulating chamber for providing an output from the granulating chamber through which the tire fragments fall, said exit chute comprising a tapered housing having a relatively wide mouth at an upper end thereof adjacent the granulating chamber for receiving the tire fragments from the granulating chamber and a relatively small opening at a bottom end thereof through which tire fragments fall, and a tapered baffle within the housing, said tapered baffle extending from the upper end of the housing and extending said mouth separating the mouth from an upper exit portion of the chute including at least one opening in the upper portion of the housing through which less dense components exit;
   means for inducing an air flow upwardly from said small opening through the exit chute to urge the less dense components upwardly against gravity and out of the upper exit portion of the chute, the air flow being of sufficient force to prevent commingling and compaction of the less dense components with remaining components of the tire fragments.

12. The apparatus of claim 11 further comprising a fragment classifier located near the small opening at the bottom end of the housing for receiving fragments therefrom and segregating the received fragments into at least two separate groups according to fragment size.

13. The apparatus of claim 12 further comprising means located near the bottom end of the housing intermediate the small opening and the fragment classifier for segregating ferromagnetic components of the tire fragments, the means for segregating the ferromagnetic components of the tire fragments comprising a rotatable cylindrical drum having an exterior generally cylindrical surface, a magnet located closely adjacent a segment of the interior of the drum for causing the ferromagnetic components of the tire fragments to adhere to the drum surface and be rotated along with the drum surface to a location remote from the magnet where said ferromagnetic components are easily removed and conveyed away.

* * * * *